United States Patent [19]

Hanser et al.

[11] 3,870,074

[45] Mar. 11, 1975

[54] VALVE FOR CONTROLLING A REVERSIBLE, ROTARY HYDRAULIC MOTOR

[75] Inventors: Paul Edmund Hanser, Moline, Ill.; William Lee Snyder, Dubuque, Iowa

[73] Assignee: Deere & Company, Moline, Ill.

[22] Filed: Apr. 26, 1974

[21] Appl. No.: 464,309

[52] U.S. Cl...... 137/596.16, 137/625.6, 137/625.61
[51] Int. Cl............................................ F16k 11/00
[58] Field of Search....... 137/625.61, 596.14, 625.6, 137/625.3, 625.64, 596.16; 251/283, 33; 91/444, 454, 461, 466

[56] References Cited
UNITED STATES PATENTS

| | | | |
|---|---|---|---|
| 3,232,316 | 2/1966 | Carlisle | 137/596.15 |
| 3,603,348 | 9/1971 | Wright | 137/596.16 X |
| 3,736,960 | 6/1973 | Cohen | 137/625.6 |

Primary Examiner—Alan Cohan
Assistant Examiner—Robert J. Miller

[57] ABSTRACT

A pilot-operated direction control valve includes first and second valve stems respectively axially shiftably mounted in identical first and second sleeve-lined bores having respective opposite closed and open ends with the open ends being in fluid communication with a fluid reservoir. Each valve bore includes first annular recesses adapted for connection to a source of fluid pressure, and the first and second bores respectively have second annular recesses respectively adapted for connection to first and second work ports of a hydraulic motor. Mounted on each of the valve stems are first and second valve elements respectively of the poppet and spool type, the first valve element acting to control the flow of fluid between the first and second recesses of a respective bore and the second valve element acting to control the flow of fluid between the second recess and the open end of the bore. The first valve elements are respectively slidable in the pair of bores adjacent the closed ends thereof and have metering orifices therein which place the first recesses in fluid communication with the closed ends of the bores. A pair of fluid passages respectively extend substantially axially through the pair of valve stems and connect the closed ends of the bores to the reservoir. A pair of closure members are respectively associated with the pair of fluid passages of the pair of valve stems and normally block the fluid passages to maintain a balanced pressure condition across the first valve elements, the pair of closure members being selectively shiftable to respectively permit flow through the pair of passages to establish pressure drops across the associated first valve elements. This causes a respective first valve element, its associated valve stem and the associated second valve element to be shifted downwardly resulting in the unseating of the first valve element and the movement of the second valve element to a blocking position wherein it prevents flow between the second recess and open end of the associated bore.

5 Claims, 1 Drawing Figure

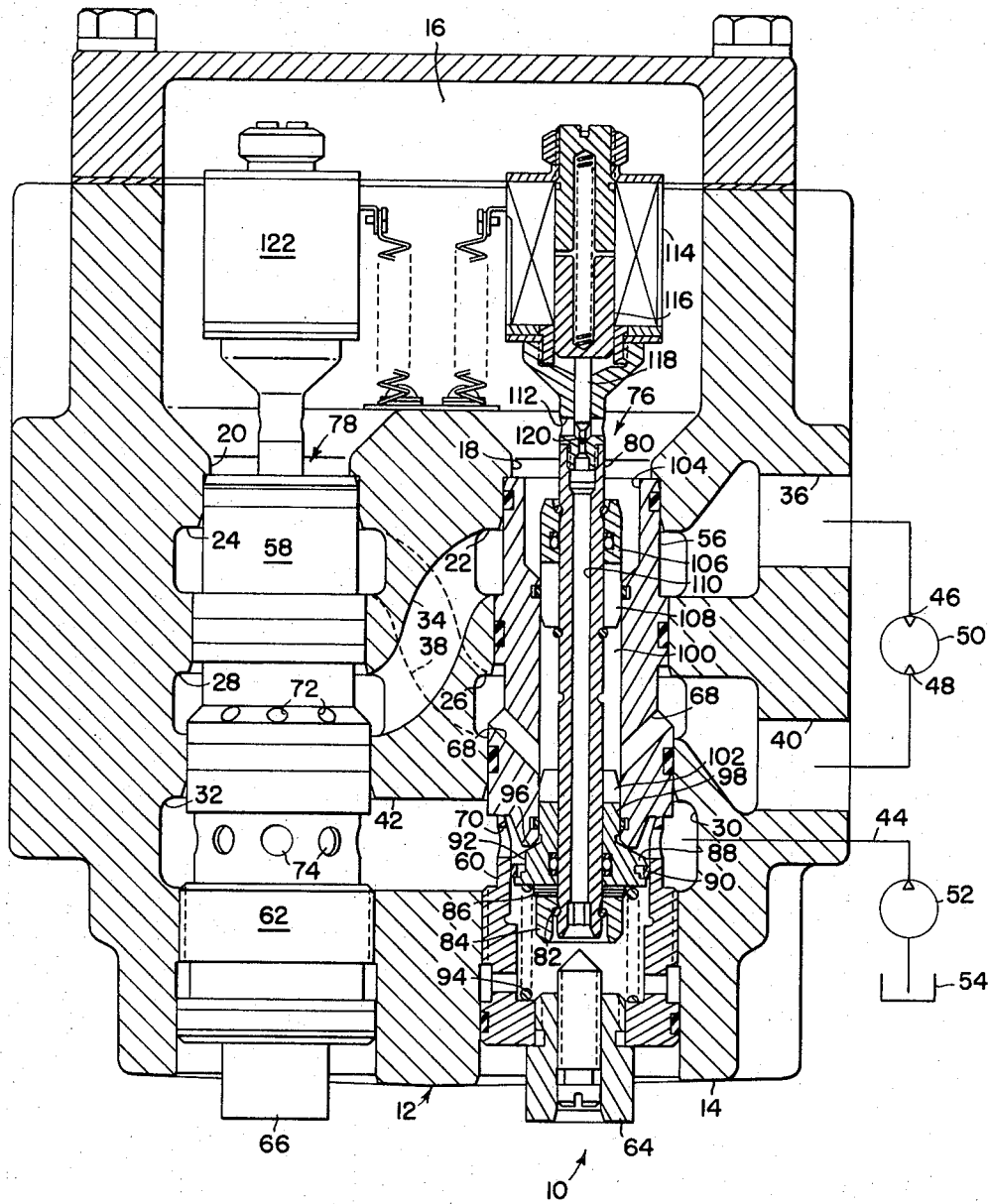

VALVE FOR CONTROLLING A REVERSIBLE, ROTARY HYDRAULIC MOTOR

BACKGROUND OF THE INVENTION

The present invention relates to a direction control valve for controlling the flow of fluid to and from the opposite work ports of a reversible, rotary hydraulic motor and more particularly relates to a control valve which is similar to the control valve disclosed in U.S. application Ser. No. 455,584 filed in the names of the present applicants on 28 Mar. 1974.

The direction control valve disclosed in the above-identified patent application Ser. No. 455,584 is directed to a valve for controlling the flow of fluid to the opposite work ports of an extensible and retractable hydraulic motor while the present application is directed to a valve for controlling the flow of fluid to the work ports of a reversible, rotary hydraulic motor. The necessity for the difference in the two valves stems from the fact that both work ports of an extensible and retractable hydraulic actuator are normally blocked from pressure and reservoir when the valve controlling it is in a neutral position while both work ports of a reversible rotary hydraulic motor are normally connected to the reservoir when the valve controlling the rotary motor is in a neutral condition.

SUMMARY OF THE INVENTION

According to the present invention there is provided a novel pilot-operated direction control valve generally of the type disclosed in U.S. application Ser. No. 455,584 but which is constructed for controlling a reversible, rotary hydraulic motor.

It is a broad object of the invention to provide a control valve, of the type discussed immediately above, which is of simple construction. A more specific object of the invention is to provide a valve having poppet valve elements located so as to control the flow of high pressure fluid between a source of fluid pressure and the opposite work ports of the hydraulic motor and for preventing the leakage of high pressure fluid to the reservoir when the valve is in a neutral condition. Additionally, it is an object to provide a valve having spool valve elements for controlling the flow of fluid between the opposite work ports of the motor and the reservoir.

A further object of the invention is to provide a valve including a pair of valve stems respectively mounted in a pair of sleeve-lined bores wherein each valve stem has a poppet valve element mounted thereon and each valve stem cooperates with a respective sleeve-lined bore to define an annular passage for connecting a motor work port to a reservoir at the end of the valve bore, and a respective spool valve element is located for selectively blocking the annular passage.

These and other objects will become apparent from a reading of the ensuing description in conjunction with the appended drawing.

BRIEF DESCRIPTION OF THE DRAWING

The sole FIGURE is a mixed sectional and schematic view showing the control valve of the present invention in longitudinal cross section and schematically representing the connection of the control valve with a source of fluid pressure and a rotary fluid motor.

DESCRIPTION OF THE PREFERRED EMBODIMENT

Referring now to the drawing, therein is shown a fluid system embodying a direction control valve constructed according to the principles of the present invention, the fluid system being indicated in its entirety by the reference numeral 10. The fluid system 10 includes a valve assembly 12 comprising a valve body 14 having a cavity in its upper portion which defines a reservoir 16. Extending vertically in the valve body and having upper ends opening into reservoir 16 are identical right and left bores 18 and 20, respectively. The bores 18 and 20 respectively include top, intermediate and bottom annular recesses 22 and 24, 26 and 28 and 30 and 32, respectively. The top annular recess 22 of the right bore and the intermediate annular recess 28 of the left bore are interconnected by a cross passage 34, the annular recess 22 further being connected to an upper control port 36 which extends to the outer surface of the valve body 14. The top annular recess 24 of the left bore 20 is connected to the intermediate recess 26 of the right bore 18 through means of a cross passage 38, the intermediate recess 26 also being connected to a lower control port 40 which extends to the outer surface of the valve body 14. The bottom annular recesses 30 and 32 of the right and left bores 18 and 20 are interconnected by a passage 42, the annular recess 18 also being connected to a pressure inlet port shown schematically at 44. The upper and lower control ports 36 and 40 are respectively connected to first and second work ports 46 and 48 of a reversible rotary hydraulic motor 50. A hydraulic pump 52 has inlet and outlet ports respectively connected to a reservoir 54 and the pressure inlet port 44. Respectively tightly fitted in end-to-end relationship in the right and left bores 18 and 20 are upper sleeves 56 and 58 and lower sleeves 60 and 62 the latter cooperating with respective plugs 64 and 66 to close the lower ends of the bores 18 and 20. Sleeves 56 and 60 provided in the right bore 18 respectively have sets of ports 68 and 70 which establish fluid communication between the interiors of the respective sleeves and the intermediate and bottom recesses 26 and 30, respectively. Similarly, the sleeves 58 and 62 provided in the left bore 20 have respective sets of ports 72 and 74 extending through the walls thereof to establish fluid communication between the interiors thereof and the top and intermediate recesses 24 and 28. The right and left bores 18 and 20 and the respective sleeves located therein thus cooperate to define respective right and left valve bore means.

Respectively axially disposed in the right and left bores 18 and 20 are identical right and left valve assemblies 76 and 78. Since the valve assemblies 76 and 78 are identical, much of the detailed description of the left valve assembly is omitted for the sake of brevity. Resuming then with the description of the right valve assembly 76, it includes a valve stem 80 having a cylindrical portion disposed axially within the bore 18. Carried adjacent the lower end of the valve stem 80 is a snap ring 82 which serves to prevent a retaining collar 84 from slipping off the bottom of the valve stem. A plurality of shims 86 are located at the top of the collar 84 and serve to time the opening and closing of valve elements to be described below. Slidably mounted on the valve stem 80 above the shims 86 is a piston-like poppet element 88. The valve element 88 is dimensioned for slidably engaging the inner wall surface of the lower sleeve 60 and, for the purpose of preventing leakage across the valve element 88, it is provided with an annular groove in which is located a sealing ring 90 of a split type having a small gap between the ends thereof. An opening 92 leads to the groove containing the sealing ring 90 and cooperates with the gap in the sealing ring to define a restricted fluid passage connecting the inlet port 44 in fluid communication with the closed bottom end of the bore 18. In the neutral condition of the valve shown, the fluid pressure at the opposite sides of the valve element 88 is equalized; however, the axially projected area at the bottom of the element 88 which is exposed to this pressure is larger than the axially projected area at the top of the element resulting in a net upward force acting on the element. This force acts together with a compression coil spring 94 mounted between a shoulder defined by a bottom portion of the lower sleeve 60 and the bottom surface of the valve element 88 to urge the latter upwardly to bring an upwardly facing conical seating surface thereof to seating engagement with a valve seat 96 formed at the bottom of the upper sleeve 56. The poppet valve element 88 includes an upper spool-like portion 98 which projects into an annular passage 100 formed by the inner wall of the upper sleeve 56 and the outer surface of the valve stem 80. The upper end of the upper valve portion 98 is provided with a plurality of metering grooves 102. The upper end of the annular passage 100 is enlarged as at 104 and mounted on the valve stem 80 so as to be slidably engaged with the sleeve 56 at a location below the enlarged part 104 is a spool valve element 106 which is held in place by upper and lower snap rings and which has metering grooves 108 at its lower end.

Thus, when the valve assembly 12 is in the neutral condition shown, the poppet valve element 88 will be seated against the valve seat 96 and the upper portion 98 of the valve element 88 will extend into the annular passage 100 so as to block pressure fluid at the pressure inlet 44 from entering the annular passage 100, the upper end portion 104 of the passage 100 being in fluid communication with the reservoir 16 by virtue of the fact that the metering grooves 108 of the spool valve element 106 extend into the enlarged part 104 of the annular passage 100. With the annular passage 100 being in fluid communication with the reservoir, it will be appreciated that the work port 48 of the motor 50 will be connected to the reservoir 18 through a passage means including the lower control port 40 and the set of ports 68 in the upper sleeve 56. Further, if the left valve assembly 78 is in the same condition that the right valve assembly 76 is, the work port 46 of the motor 50 will be connected to the reservoir 16 through passage means including the upper control port 36, the top recess 22, the cross passage 54, the sets of ports 74 in the lower sleeve 62 and an annular passage corresponding to the annular passage 100.

For the purpose of selectively connecting one of the work ports of the motor 50 in fluid communication with the pump 52 while connecting the other work port of the motor in fluid communication with the reservoir 16, there is provided a pilot actuator means for causing selective actuation of the right and left valve assemblies 76 and 78. Specifically, the structure for effecting pilot operation of the right valve assembly 76 includes a pilot fluid passage 110 which extends axially in the valve stem 80 from the lower end of the valve stem to a location adjacent the top of the valve stem whereat the passage terminates in a plurality of radial ports 112. Mounted on the top end of the valve stem 80 for movement therewith is a solenoid 114 having a downwardly biased plunger 116 which engages a valve pin 118 to normally seat the latter with a valve seat 120 formed in the pilot fluid passage 110 just below the radial ports 112. When the solenoid 114 is actuated, the plunger 116 rises thus permitting the valve pin 118 to be unseated by the fluid pressure which is in the pilot fluid passage 110. Flow then occurs across the poppet valve element 88 by way of the axial metering passage means therein and the attendant pressure drop across the element 88 causes the latter to shift downwardly. Downward movement of the element 88 cause concurrent downward movement of the stem 80 and, hence, of the spool valve element 106. As the metering grooves 102 of the poppet valve element 88 approach the lower end of the upper sleeve 56, pressure fluid from the inlet port 44 will be metered into the annular passage 100. In the meantime, the downward movement of the valve stem 80 will have moved the metering grooves 108 of the spool valve element 106 completely within the annular passage 100 below its enlarged upper part 104 to thus prevent fluid from flowing to the reservoir. The pressure fluid from the pump 52 will then flow from the annular passage 100 to the work port 48 of the motor 50 by way of the set of ports 68 and the lower control port 40. It will be appreciated that since the valve assembly 78 will not have been actuated, the work port 46 of the motor 50 will remain connected to the reservoir 16 in the manner described above. Further, it will be appreciated that the work port 46 of the hydraulic motor 50 can be connected to the pump 52 and the work port 48 connected to the reservoir 16 by merely actuating a solenoid 122 comprising part of the left valve assembly 78 to cause pilot operation thereof while maintaining the valve assembly 78 in its neutral position shown.

The operation of the system 10 is thought to be adequately described above therefore, for the sake of brevity, no further description of the operation is given. Suffice it to say that the use of the poppet valve elements and the spool valve elements contributes to important features of the valve namely that of preventing high pressure fluid from leaking to the reservoir and that of providing for the metering of fluid to and from the motor 50 so as to effect smooth operation of the same.

We claim:

1. A valve for controlling the flow of fluid to and from first and second work ports of a reversible, rotary hydraulic motor, comprising: a valve body defining similar first and second valve bore means having axially spaced first and second ports and first locations arranged in that order from respective second locations; the first ports of each bore means being adpated for connection to a source of fluid pressure, the second ports of the first and second bore means respectively being adapted for connection to first and second motor work ports and the first locations of each bore means being adapted for connection to a fluid reservoir; each of said first and second bore means having a valve stem axially shiftably mounted thereon and spaced therefrom to define an annular passage extending at least between the first ports and first locations; first and second valve elements carried by each valve stem in sliding engagement with a respective bore means at respective locations between the first and second ports and between the second ports and first locations thereof; each of said valve stems being shiftable in a respective bore means between a neutral position wherein the first valve element on the valve stem is engaged with a first valve surface means of the respective bore means to block fluid communication between the first and second ports while the second valve element means is spaced from second valve surface means of the respective bore means to permit fluid communication between the second port and first location, and an actuated condition wherein the first valve element is unseated from said first valve surface means and said second valve element is seated with the second valve surface means.

2. The valve defined in claim 1 wherein each of the first and second valve bore means is larger in diameter at its first port and first locations than at a central section thereof which cooperates with a respective valve stem to form said annular passage; the first and second valve elements carried by a respective valve stem each being slidably mounted in the central section of a respective bore means and including metering groove means located such that when the valve stem is in its neutral position the metering groove means of the first and second valve elements are respectively located entirely in the central section of the bore means and when the valve stem is in its actuated position the metering grooves of the first and second valve elements are respectively located partially and entirely in the central section of the bore means.

3. The valve defined in claim 1 wherein each of the first and second valve bore means includes a reduced in diameter central section extending between the first port and first location thereof and includes a valve seat facing axially in the direction of said second location at a location at one end of the central section between the first port and second location; and each of said first valve elements including poppet surface means engageable with a respective valve seat.

4. The valve defined in claim 3 wherein each of the second valve elements include spool surfaces engageable with the central section of a respective valve bore means.

5. The valve defined in claim 3 wherein the valve body defines a fluid reservoir in fluid communication with the first locations of each of said first and second bore means; said first and second bore means having respective closed ends disposed adjacent said respective second locations thereof; a pilot fluid passage means extending axially through each of said valve stems for providing fluid communication between the reservoir and a closed end of a respective bore means; said first valve element slidably engaging a respective bore means at its second locations and having metering passage means extending axially therethrough for providing fluid communication between the first port and closed end of the respective bore means; and pilot valve means mounted on each valve stem and including an axially shiftable member selectively movable between blocking and unblocking relationship relative to a respective pilot fluid passage means.

* * * * *